United States Patent [19]
Guenthner et al.

[11] Patent Number: 6,134,588
[45] Date of Patent: Oct. 17, 2000

[54] HIGH AVAILABILITY WEB BROWSER ACCESS TO SERVERS

[75] Inventors: Timothy John Guenthner; Francis Daniel Lawlor; Charles Rudolph Schmitt, all of Austin, Tex.

[73] Assignee: International Business Machines Corporation, Armonk, N.Y.

[21] Appl. No.: 08/968,037

[22] Filed: Nov. 12, 1997

[51] Int. Cl.[7] .............................. G06F 13/38; G06F 15/17
[52] U.S. Cl. ..................... 709/226; 709/203; 709/232; 714/4
[58] Field of Search ..................... 709/226, 229, 709/228; 707/9; 395/600

[56] References Cited

U.S. PATENT DOCUMENTS

| | | | |
|---|---|---|---|
| 5,483,652 | 1/1996 | Sudama et al. | 395/600 |
| 5,740,371 | 4/1998 | Wallis | 709/229 |
| 5,848,412 | 12/1998 | Rowland et al. | 707/9 |
| 5,855,015 | 12/1999 | Shoham | 707/5 |
| 5,884,038 | 3/1999 | Kapoor | 709/226 |
| 5,907,680 | 5/1999 | Nielsen | 709/228 |

OTHER PUBLICATIONS

Microsoft Press Computer dictionary (third edition).

*Primary Examiner*—Zarni Maung
*Assistant Examiner*—Mahmanzar Moezzi
*Attorney, Agent, or Firm*—Jeffrey S. LaBaw; David H. Judson

[57] ABSTRACT

One or more policies are implemented at a Web browser to enhance access to Web servers that host content requested by the browser. When the browser issues a request, a name service returns a list of IP addresses that may service that request. The list is configured as "random" or "ordered" according to a given naming convention or other local policy, and IP addresses are selected from the list at random or in order (as the case may be) until a connection to an appropriate server is obtained. The browser remembers (for a given time period) which IP addresses have failed so that those addresses are not repeatedly tried. The browser's "timeout" period is also selectively varied depending on the type of list returned from the name service.

34 Claims, 4 Drawing Sheets

FIG. 8

HIGH AVAILABILITY WEB BROWSER ACCESS TO SERVERS

BACKGROUND OF THE INVENTION

1. Technical Field

The present invention relates generally to client-server computing over the Internet and more particularly to a method for ensuring that a Web browser obtains high availability to Web services.

3. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL.

When the user of the browser specifies a link, the client issues a request to a naming service to map a hostname (in the URL) to a particular network IP address at which the server is located. The naming service returns a list of one or more IP addresses that can respond to the request. Using one of the IP addresses, the browser establishes a connection to a server. If the server is available, it returns a document or other object formatted according to HTML. If the server is not available or overloaded, however, the user may receive an error message, e.g., "Server not responding" or the like. This is undesirable.

As Web browsers become the primary interface for access to many network and server services, the problem arises of how best to ensure "availability" of Web services in a manner that is also both scaleable and balanced. Users of client machines desire prompt and efficient access to Web servers so that Web pages download seamlessly and as fast as practicable given the physical constraints of the applicable network connections. Web site providers desire to operate an appropriate number of servers to handle client loads in a scaleable and balanced manner. An efficient network ensures that clients can find an available server, even if servers in the network fail.

A number of server-based solutions have been proposed and/or implemented to attempt to ensure that Internet services remain available, scaleable and well-balanced. One type of approach is the "front end" server configuration or cluster, wherein a plurality of "proxy" servers are maintained at a particular access location common to multiple clients, with the servers being used to mirror high traffic Web sites. While the front end approach provides certain improved service, it is not readily scaleable. Another approach utilizes a "round robin" nameserver to hand out one of a list of IP addresses each time the nameserver receives an HTTP request. This approach does a poor job of balancing request load, and its effectiveness is limited due to client caching.

It would be highly desirable to provide a client-side solution to ensure "availability" of Web services to a Web browser.

SUMMARY OF THE INVENTION

It is a primary object of this invention to enhance the availability of Web server resources to Web clients.

It is another primary object of the invention to increase the speed at which a browser finds an available server to respond to a given request.

It is yet another important object of this invention to enhance the availability of Web server resources in a network from a Web client's perspective.

It is yet another object of this invention to provide improved availability, scalability and workload-balanced access from browser clients to servers within a computer network or domain.

It is still another object of this invention to enhance a Web browser to enable the browser to fully exploit availability, scalability and workload-balancing enhancements that are being developed for Web servers.

According to the present invention, the list of IP addresses returned to a Web browser in response to a request is used in an "intelligent" manner to enhance the availability of Web services. The "intelligence" is provided at the Web browser and includes a number of preferred "policies" or functions.

According to a first policy, a particular list returned from the nameserver may be considered "random" or "ordered." If the list is configured as a random list, the browser selects an IP address from that list at random; if other IP addresses are required to make the connection, the browser also selects those at random as well. If the list is configured as an ordered list, the browser first selects the first IP address from the list and, if necessary, uses other IP addresses from that list in an ordered sequence. Thus, when the browser tries any IP address and finds that the server is not responding, the browser tries another address in the list, with the initial IP address selected at random or by any other suitable balancing algorithm (if a front end approach is used) to balance access by the browser to the list of servers. This provides good server balance without complex front end technologies.

According to another policy, the browser remembers (for a given time period) which addresses have "failed" so that these addresses are not tried repeatedly to contact a server. Moreover, the browser's "timeout period", i.e. the period during which the browser attempts to establish a connection, is preferably shortened when there are more untried IP addresses in the list. These features improve the perceived responsiveness of the browser from the user's viewpoint. Preferably, the browser's timeouts are configurable by the user to allow the user to tune the behavior to the network environment and to the user's preferences.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
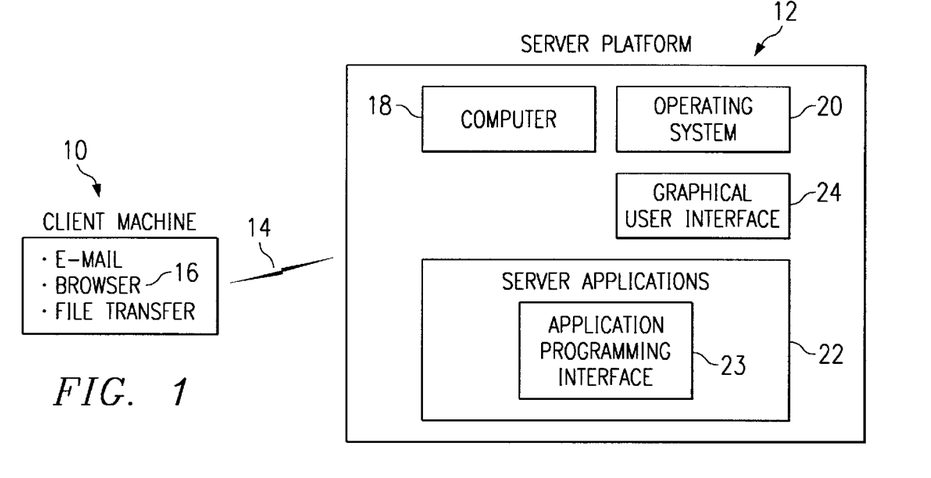
FIG. 1 is a representative system in which the present invention is implemented.

A representative system in which the present invention is implemented is illustrated in FIG. 1. A client machine 10 is connected to a Web server platform 12 via network 14. For illustrative purposes, network 14 is the Internet, an Intranet or other known network connection. Web server platform 12 is one of a plurality of servers which are accessible by clients, one of which is illustrated by machine 10. A representative client machine includes a browser 16, which is a known software tool used to access the servers of the network. The Web server platform supports files (collectively referred to as a "Web" site) in the form of hypertext documents and objects. In the Internet paradigm, a network path to a server is identified by a so-called Uniform Resource Locator (URL).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The Web server 18 also includes an Application Programming Interface (API) 23 that provides extensions to enable application developers to extend and/or customize the core functionality thereof through software programs commonly referred to as "plug-ins."

A representative Web client is a personal computer that is x86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins.

Figure 2:
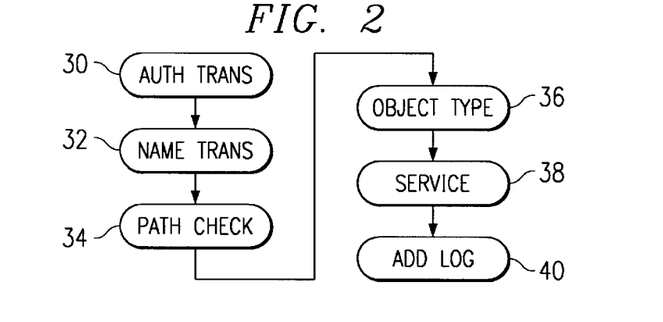
FIG. 2 is a flowchart illustrating the conventional Web server processing associated with an HTTP request from the Web client to the server shown in FIG. 1.

As is well-known, the Web server accepts a client request and returns a response. The operation of the server program 22 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

Figure 3:
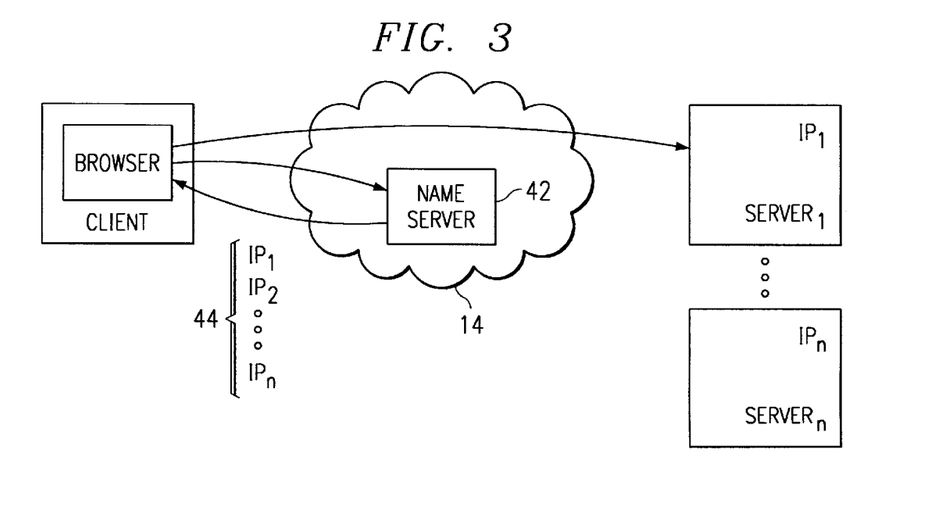
FIG. 3 is a simplified representation of how a nameserver returns a list of one or more IP addresses in response to an HTTP request.

A URL or "Uniform Resource Locator" is defined in RFC 1945, which is incorporated herein by reference. As is well known, the URL is typically of the format "http://somehost/. . ." where "somehost" is the hostname portion of the URL. FIG. 3 illustrates the usual manner in which a URL is resolved into an actual IP address for a Web server. In particular, network 14 (as illustrated in FIG. 1 above) includes a nameserver 42 that maps hostnames (in URLs) to actual network addresses. A representative example is the Domain Name Service (DNS) currently implemented in the Internet. The process of having a Web client request an address for a hostname from a nameserver is sometimes referred to as name resolution. In the current TCP/IP protocol used on the Internet, nameserver 42 resolves the hostname into a list (identified by reference numeral 44) of one or more IP addresses that are returned to the Web client upon an HTTP request. Each of these IP addresses identifies a server that hosts the particular content that the user of the Web client has requested. Thus, the current IP protocol allows for a query to a nameserver to resolve a name to an IP address to return a list of addresses. In the prior art, this is a list of one address and most browser products only expect, or use, one such address.

According to a preferred embodiment of the invention, the list 44 of IP addresses is used in an "intelligent" manner to provide high availability Web browser access to Web servers. To this end, the list 44 of one or more IP addresses are used to build a Hostname Address List (HAL) that is then used to control how the particular IP addresses therein are accessed and managed by the browser to provide the objects of the invention.

Figure 4:
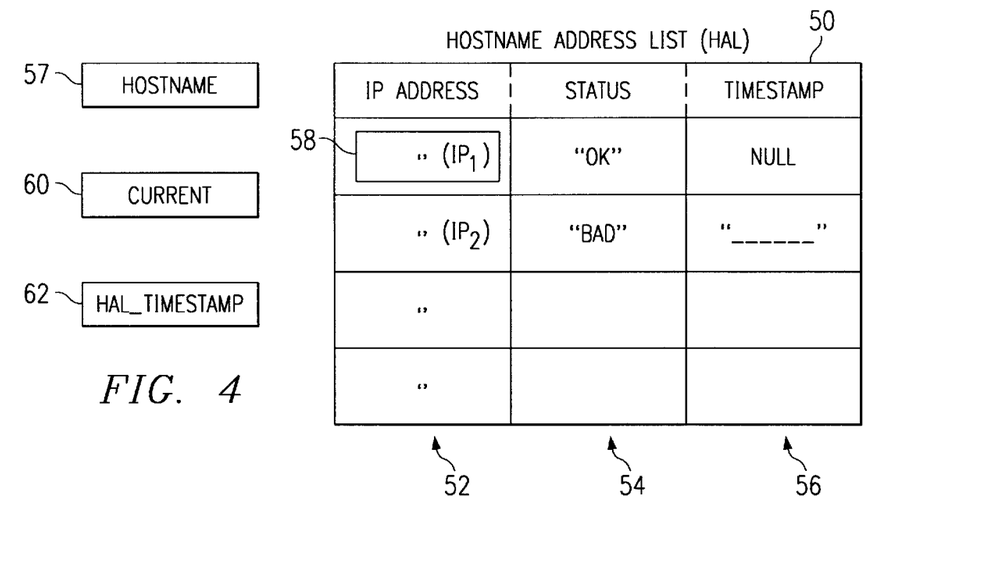
FIG. 4 is a representation of a Hostname Address List (HAL) which facilitates high availability Web browser access to Web servers according to the present invention.

FIG. 4 illustrates a preferred format for a Hostname Address List (HAL) 50 according to the present invention. Preferably, one HAL exists for each hostname to be remembered, although one of ordinary skill will appreciate that a master HAL having sublists may be used as well. The HAL 50 is built by the browser (or it could be downloaded thereto) and includes an IP Address column 52, a Status column 54, and a Timestamp column 56. The IP addresses returned from the nameserver are used to populate the IP Address column 52. In particular, each IP address returned from the nameserver becomes an entry in the HAL as identified by reference numeral 58. There is also a single Hostname 57 for each HAL. The HAL also includes a pointer 60, referred to as "Current" and a timestamp 62, referred to as "HAL$_{13}$ Timestamp." The timestamp 62 identifies the time at which the particular HAL is built. When the HAL is built, each entry in the Status column 54 is set to "OK". Individual entries may be set to "Bad" at some subsequent time identified by the timestamp in the Timestamp column 56. Thus, initially (when the HAL is first built) the Timestamp column 56 has null values.

Thus, the $HAL_{13}$Timestamp 62 is the time that the HAL is initially built (usually the time the IP Addresses are fetched from the nameserver). The Current pointer 60 is an index into the "current" entry in the HAL 50, and the Status flag is either "OK" or "Bad". According to the present invention, a particular HAL may be deemed to be a "random" HAL, in which case entries from the HAL are selected for use by the browser at random, or the HAL may be deemed to be an "ordered" HAL, in which case entries from the HAL are selected for use by the browser in an ordered fashion (usually, but not necessarily, top to bottom). The manner in which a particular HAL is identified or set as "random" or "ordered" is quite varied. Thus, for example, a given naming convention may be used for this purpose with all returned lists being deemed "ordered" unless they match a certain naming criteria or other locally-implemented policy. Thus, if a set of IP addresses returned from the nameserver includes a hostname that begins with a certain value (e.g., an "@"), then the HAL (by the naming convention) may be set at "random". Alternatively, all lists returned may be deemed "random" by default unless they satisfy some other local policy (in which case they would be deemed "ordered") . Any particular naming convention (or some other local policy) may be used for this purpose.

An "ordered" list is sometimes referred to herein as a "primary/backup" list to indicate that IP addresses selected therefrom are ordered for use (with the first address being considered "primary" and the remainder of the addresses being the "backup" addresses, although the reverse sequence or some other ordered sequence may be used as well). When the HAL is random, the client selects a random entry, as will be seen. In a preferred embodiment (as will be illustrated below), if a particular HAL is not identified as a random list, then the HAL is used as a "primary/backup" list. When the HAL is used in the "primary/backup" manner, the first entry in the HAL is the preferred server. The client then initially attempts to access the primary (first) server. If it is unable to access the first server, it works its way down the list in an ordered manner.

The advantages of the present invention are provided by implementing HALs and enforcing one or more "policies" at the browser with respect to those lists. According to one policy, the browser selects a random IP address from a "random" list or the first (i.e. the "primary") item from a "primary/backup" list. When the "primary/backup" list is used, the browser works its way down the list as necessitated by any failures. According to another policy, the browser preferably re-fetches IP addresses and thus re-builds HALs accordingly, especially random lists, as frequently as possible. Another policy enforced is that the browser re-selects a random list element whenever a new host connection (as will be described below) is established or perhaps even more frequently. If a particular server fails to respond in response to a selected IP address, a "timeout" policy is preferably enforced. In particular, the browser marks (in the HAL) the failed entry "Bad" for a given time period (e.g., one hour). Further, another policy that is advantageous is to shorten the timeout period normally used by the browser before a new IP address is tried. This latter policy is especially useful when random entries remain untried. These techniques, whether individually and/or collectively, improve Web browser access to Web servers in the computer network and enable servers to be easily scaled and load-balanced.

Figure 5:
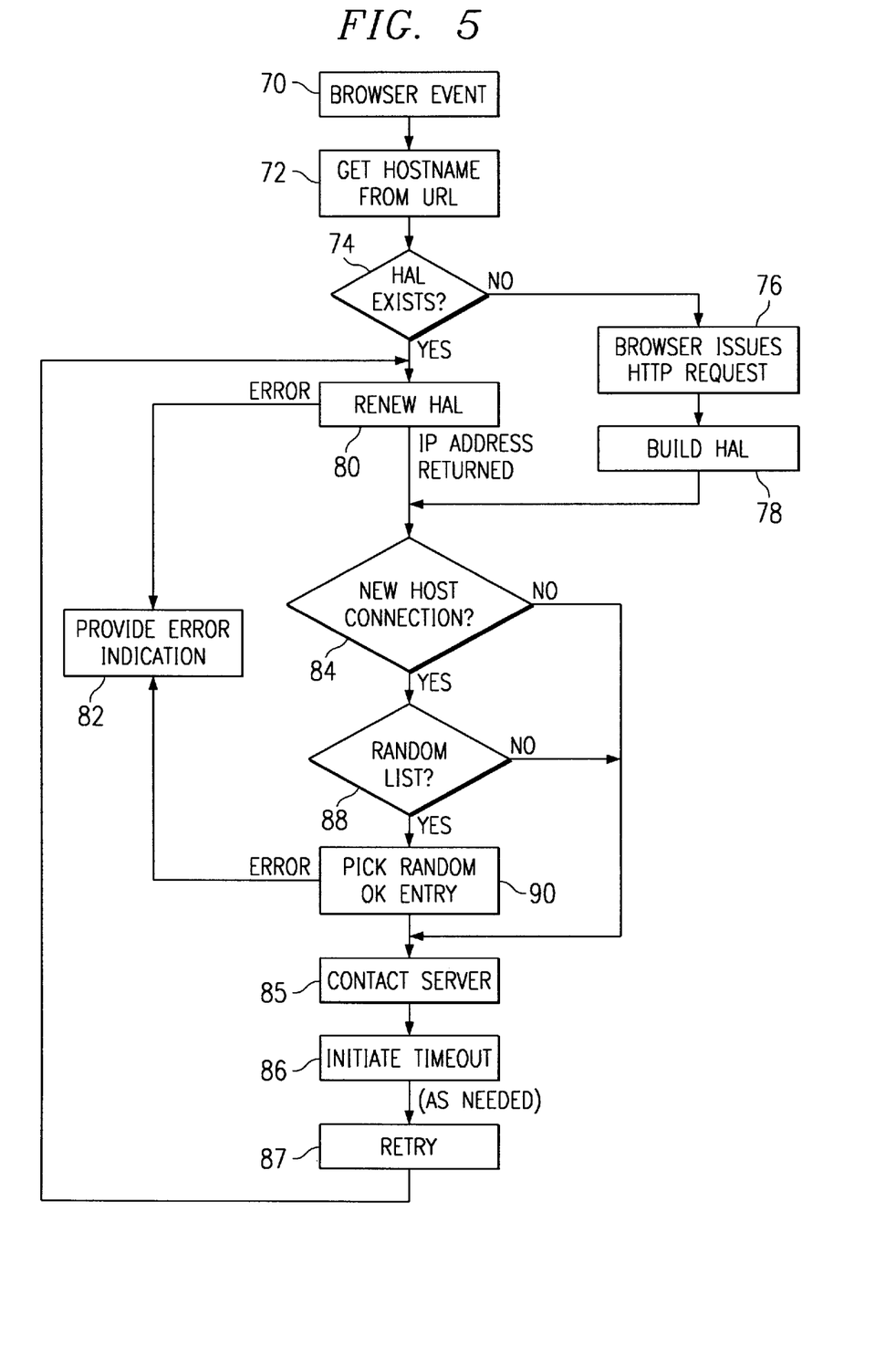
FIG. 5 is a flowchart of a Hostname Process of the present invention for resolving a URL to a particular IP address according to the present invention.

With the above background, a preferred implementation of the present invention is now described. The main processing routine for resolving a URL hostname to an IP address is illustrated in FIG. 5. This functionality is preferably implemented in software as part of the browser. Alternatively, the functionality may be part of a browser "plug-in" or helper application. An alternative implementation is to build in the functionality to the browser itself.

The routine begins at step 70 upon a given Web browser user interface event. Typically, step 70 involves activation of a link in a Web page being currently displayed (e.g., by having the user move the cursor over an anchor and clicking Enter). Or, the user may type in a URL (or portion thereof) in a known fashion and click Enter. Other types of user input actions (e.g., a mouseover or keystroke) may trigger the routine as well. At step 72, the routine gets the hostname from the URL. A test is then done at step 74 to determine whether the browser already has a HAL which includes the hostname. If not, the routine branches to step 76. At step 76, the browser issues an IP request to the nameserver (e.g., DNS) to resolve the URL. As is well known, the nameserver responds by returning a list of one or more IP addresses. At step 78, the routine builds the HAL. This involves a number of substeps. In particular, each IP address returned from the nameserver is set up as a row entry (in the HAL). The Status column is then set to "OK" for each entry, and the "Current" pointer is set to the first entry in the list. The $HAL_{13}$Timestamp 62 is also set at this time. The timestamps in Timestamp column 56 remain null values. The branch then returns to the main processing loop as indicated.

If the outcome of the test at step 74 indicates that the browser already has the HAL for the hostname, the routine continues at step 80 to a Renew HAL subroutine. Renew HAL functions generally to ensure that the most up-to-date HAL (with the most up-to-date entry) is being used to resolve the URL. Step 80, which will be described in detail below in the flowchart of FIG. 6, returns an IP address list 52 for use by the browser, or it returns an error. If the Renew HAL routine returns an error, the routine branches to step 82 and provides an error indication to the user. Typically, this is accomplished via a dialog box or the like.

Figure 6:
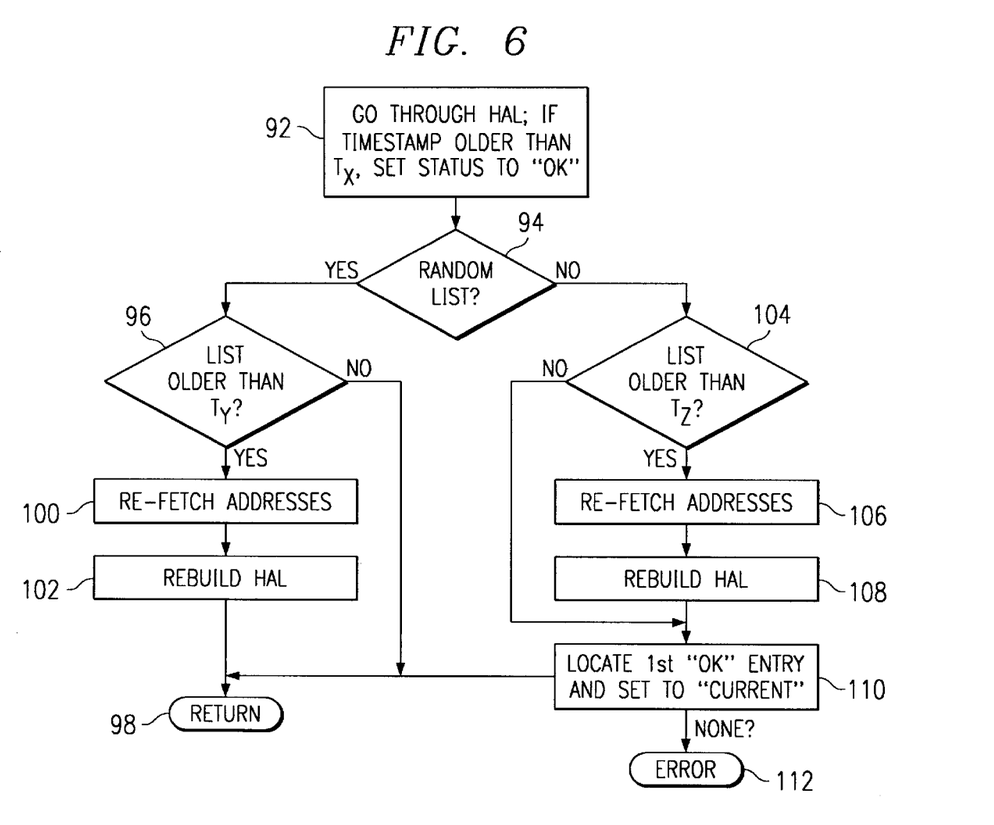
FIG. 6 is a flowchart of the Renew HAL routine of the Hostname Process that provides an up-to-date HAL for use by the Web browser.

If the Renew HAL routine returns without an error, or after step 78, the main processing routine continues at step 84 to test whether the connection is a new host connection. In particular, in the HTTP 1.0 protocol commonly in use, a call to retrieve a Web page usually involves an initial connection (to retrieve a base HTML document) and then any number of subsequent connections (to retrieve embedded objects, such as image files, that are required by the base HTML document). In the present invention, it would be undesirable to perform the routine each time the browser attempts to reconnect to the server in order to retrieve an object required by the base HTML page. Thus, step 84 tests to determine whether the connection is a new host connection (e.g., an HTTP GET request for the actual base HTML document). If the outcome of the test at step 84 is negative, which indicates that the base HTML document is required, the routine continues at step 85 to contact the server (as defined by the Current IP address returned from the HAL). At step 86, a Timeout function is initiated. Timeout function is illustrated in FIG. 6. If the Timeout function is triggered (as will be described), then the connection to the host could not be established. As a result, a Retry attempt is made at step 87.

If the outcome of the test at step 84 is positive, the routine continues at step 88 to determine whether the HAL is a random list. As noted above, a particular HAL may be defined as "random" by a given convention that may be selected by the user or otherwise set by the browser or the system on which the browser is running. If the outcome of the test at step 88 is negative, which indicates that the HAL is not a random list, the list (in the preferred embodiment) is a "primary/backup" list. Thus, the routine branches to step 85 to contact the host (and issue the Timeout) as previously described with respect to the first Hostname from the primary HAL. If, however, no entry can be found from the HAL, the routine branches to step 82 and returns and error indication to the user. If the outcome of the test at step 88 is positive, which indicates that the HAL is a random list (according to some predetermined naming convention or the like), the routine branches to step 90. In particular, at step 90, the browser randomly picks an HAL entry and sets the "Current" pointer (to that entry). The routine then passes control to steps 85–86 as previously described. This completes the main processing routine.

FIG. 6 illustrates the Renew HAL process identified above. In a preferred embodiment, this routine uses three (3) variables: $T_x$=minutes after which a host may be retried, $T_y$=minutes after which a random list should be re-fetched from the nameserver, and $T_z$=minutes after which a primary/backup list should be re-fetched from the nameserver. These variables may be set at the browser using standard configuration options.

The routine begins at step 92 by going through the HAL entries for the HAL returned. If the timestamp is older than $T_x$, then Status is set to "OK". At step 94, a test is performed to determine whether the list is a random list. If the outcome of the test at step 94 is positive, the routine continues at step 96 to test whether the list is older than the $T_y$ value. If not, the routine returns at step 98 (which passes control back before step 84 in FIG. 5). If, however, the outcome of the test at step 96 indicates that the list is older than the value $T_y$, the routine continues at step 100 to re-fetch the IP addresses (in the list) from the nameserver. At step 102, the HAL is rebuilt, and the routine then returns at step 98 (which passes control back before step 84 in FIG. 5).

If the outcome of the test at step 94 indicates that the list is not a random list, then (according to the preferred embodiment), the HAL is a primary/backup list. Thus, a test is performed at step 104 to determine whether the list is older than the value $T_z$. If so, the routine continues at step 106 to re-fetch the IP addresses (in the particular HAL) from the nameserver. At step 108, the HAL is rebuilt. If, however, the outcome of the test at step 104 indicates that the list is older than $T_z$, or after step 108, the routine continues at step 110 to locate the first "OK" entry, which is then set to "Current." If no entry is "Current", the routine branches to step 112 and returns an error. Otherwise, the selected entry is returned at step 98 (which returns control to just before step 84 in FIG. 5). This completes the processing.

Figure 7:
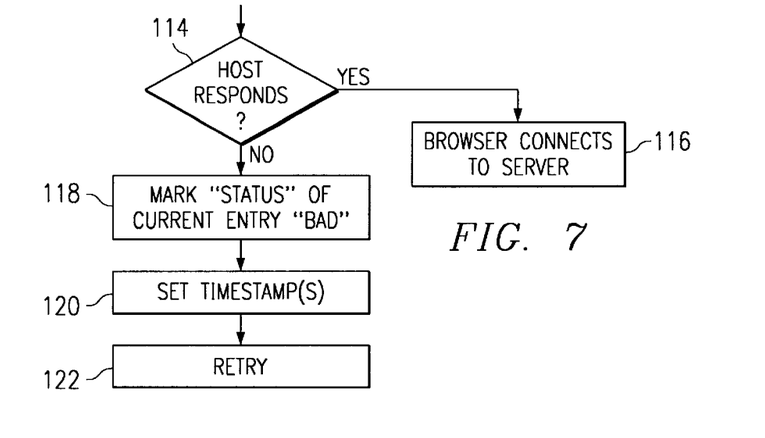
FIG. 7 is a Timeout routine of the Hostname process.

FIG. 7 illustrates the Timeout function 86, which is invoked if the host fails to respond in the given time. The routine begins at step 114. In particular, a test is made to determine whether the host responds in the specified time. If so, the browser connects to the server at step 116. If, however, the outcome of the test at step 114 is negative (because the specified timeout period has elapsed), the routine continues at step 118. In particular, the routine marks the "Status" of the "Current" entry (and all others with the same IP address) as "Bad". At step 120, the routine sets the timestamps for the entries just marked "Bad" with a current time (there may other previously-marked "Bad" entries whose timestamps are not changed). The routine then continues at step 122 to Retry. This is step 87 in FIG. 5.

The browser timeout period is preferably variable. Thus, for example, in one embodiment, the user may configure the browser timeout period manually by accessing the browser "Preferences" and re-setting the timeout period. A more preferred approach is to alter the timeout period automatically as a function of the type of list (e.g., random or ordered) returned from the name service and/or the number of IP addresses on the list that remain untried. Thus, for example, the browser may dynamically alter the timeout period if the HAL is a random list, or if the number of untried entries on the HAL is larger than a given number. Or, the timeout period could be varied (usually decreased) as a function of both the type of list and the number of entries. The actual timeout may be varied as each entry on a given HAL is tried, or after multiple such entries are tried. All of these variables are preferably configured, either manually or automatically.

The present invention provides numerous advantages. As noted above, current DNS nameserver and IP protocol definitions allow a nameserver entry for a server to have a list of IP addresses rather than just one. The current IP protocol returns the list. According to the invention, this list is then used to identify a set of servers, rather than one, which may be used to satisfy user requests.

Figure 8:
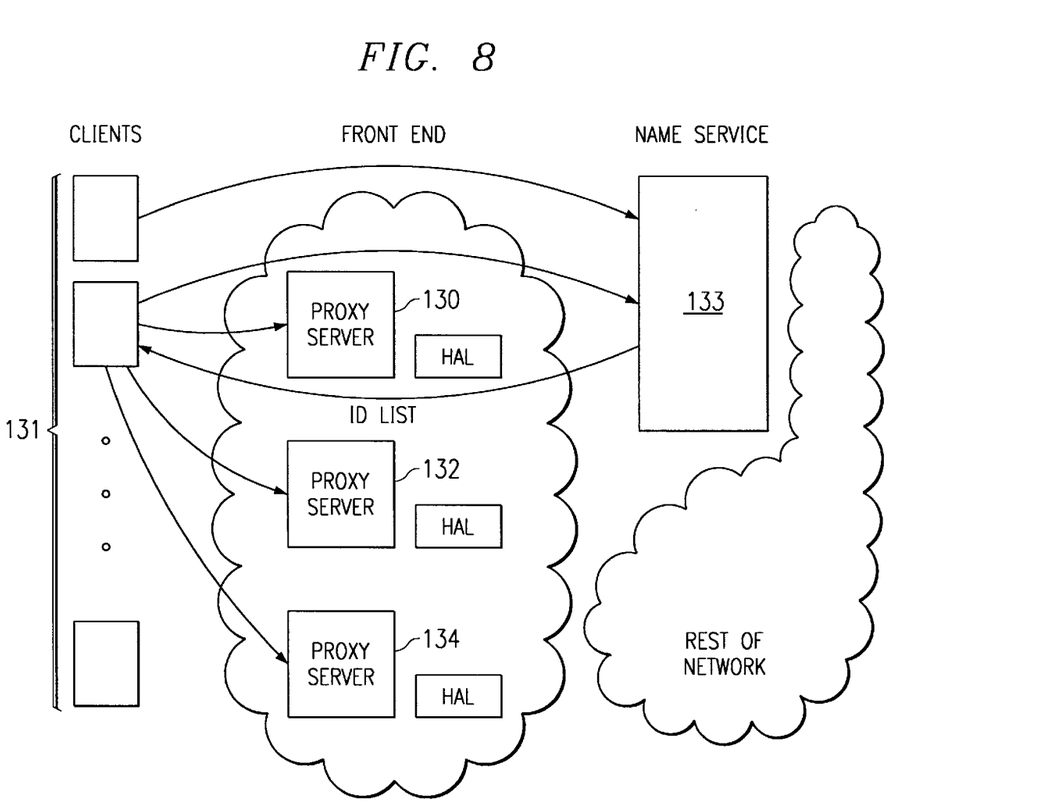
FIG. 8 is a block diagram illustrating a "front end" customer configuration that provides load-balanced and scaleable Web service to client machines that utilize the principles of the present invention.

FIG. 8 illustrates how the present invention may be used to enhance Web browser availability as proxy servers are added or removed in a "front end" customer site configuration. In this example, servers 130, 132 and 134 are proxy servers (comprising a "front end") that are installed to service a plurality of clients 131. All of the servers have a common "URL" from the perspective of a client machine running a browser. From the nameserver's 133 perspective, however, each server is mapped to a separate name, and each server generates its own HAL. Thus, when the user at a client machine activates a link to the URL, the browser at the client machine receives a list of IP addresses that may be associated with server 130, 132 or 134. The "front end"may be scaled transparently to the clients by adding or removing proxy servers as may be required. As a system administrator adds or removes servers to respond to loads, availability problems or other needs, the DNS entry for the servers is modified to reflect the servers which are expected to normally be available.

If desired, particular IP addresses in the lists may be replicated to control balance. Thus, when all the entries represent active servers, duplicate entries are made for certain servers to increase the probability of selecting that server. This provides a useful level of balancing based upon server capacity.

As previously described, the present invention preferably implements a naming convention to identify a list as "random", "primary/backup" (or some other type). There are a number of different ways in which these server lists may then be used to enhance availability, scalability and balance. For example, all the entries may represent active servers which should be used to service requests. If clients randomly select from among the entries, this policy provides a basic level of load balancing among servers.

Presently, most browsers cache the IP address (used to access a server) and continue to use it in order to reduce response time and minimize nameserver load. However, in order to be responsive to changes to the nameserver list, according to the invention the list should not be cached for too long a period. How long this period should be is variable, but a preferred time period is from once a day to once a week. Thus, when a site needs to add many servers to handle an unexpected load (e.g., as NASA did during the recent Mars exploration when live pictures were hosted on the NASA Web site), it is desirable that repeat users (who may have cached the list) re-fetch the IP address list so that they select among the current full set of available servers.

Another desirable policy is for the browser to re-select a random list element whenever a new session is established. This policy ensures that the same address is not cached and used for repeated sessions. Browsers should reselect from "random" lists at least daily and preferably even more frequently.

As also described, a special policy may be implemented if a server fails to respond to a given HTTP request. In particular, the browser marks the entry "Bad" for a short while (e.g., one hour) and tries the next list entry on a primary/backup list or another random entry on a random list.

One of the main benefits of having the HAL is improved Web server availability. To this end, the browser should detect the failure to reply by a server and attempt to connect to another address in the list. To keep from continually attempting to contact a bad server (especially the primary server in a primary/backup list), the browser "marks" the entry as "Bad" and avoids using it.

However, especially with a primary/backup list, it is desirable that clients resume using primary servers as soon as possible when the servers are restored to service. Therefore, the invention enforces a policy whereby a client retries entries that were marked "Bad" at a fairly frequent interval (at least once an hour) (so long as the client is still making requests, of course). This policy enables the client to access servers that, while previously down or overloaded, are later returned to service or otherwise available to handle the request.

With a primary/backup list, all clients preferably work their way through the list from first to last. This ensures that if a primary IP address fails and there are multiple backups, that all clients will attempt to go to the same backup (primary/backup lists are preferably used when a front end customer wants to concentrate activity on one server, yet provide backup).

Browsers preferably set a short timeout, especially for random entries. A shorter timeout minimizes the delay experienced by a user when the server being contacted has failed.

These techniques combine to improve availability, scalability and balance to servers of many types. They also handle many failure types which "system clustering" technologies cannot even detect, and they work well for servers that are geographically dispersed. Although the inventive policies are preferably implemented in a browser running in a client machine, one of ordinary skill will appreciate that one or more of the above polices may also be useful in gateway servers such as proxy and socks servers.

As noted above, one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The present invention avoids the need for a "front end" for basic load balancing and scalability. It provides significant advantages over prior server-based approaches with lower cost, simpler management and better reliability.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, the invention may be used or practiced in any type of Internet Protocol (IP) client, not just within an HTTP-complaint client having a Web browser. Thus, as used herein, references to "browser" should be broadly construed to cover an IP client.

Having thus described our invention, what we claim as new and desire to secure by letters patent is set forth in the following claims.

What is claimed is:

1. A method of communication in a computer network comprising at least one client, a plurality of servers, and a nameserver, where in response to a request issued from the browser, a list of server addresses is returned from the nameserver, the method operative in the client and, comprising the steps of:

favoring a given server address over other server addresses in the list based on a given policy;

attempting to establish a connection from the client machine to a server identified by the given server address;

if, during a timeout period, the connection to the server identified by the given server address cannot be established, restricting use of the given server address for a given time period; and attempting to establish a connection from the client machine to a second server identified by at least one of the other server addresses in the list.

2. The method as described in claim 1 wherein the given policy establishes the list as a random list and the given server address is an address selected from the list at random.

3. The method as described in claim 2 wherein the other server address is selected from the list at random.

4. The method as described in claim 2 wherein prior to selecting a given server address, the method includes the steps of:

determining whether a given first time period has elapsed since the random list was last retrieved from the nameserver; and if the given first time period has elapsed, re-fetching the list from the nameserver.

5. The method as described in claim 1 wherein the given policy establishes the list as an ordered list and the given server address is a first address in the list.

6. The method as described in claim 5 wherein the other server address is a next address in the ordered list.

7. The method as described in claim 5 wherein prior to selecting a given server address, the method includes the steps of:

determining whether a given time period has elapsed since the ordered list was last retrieved from the nameserver; and if the given time period has elapsed, re-fetching the list from the nameserver.

8. The method as described in claim 1 wherein the timeout period is variable.

9. The method as described in claim 8 further including the step of decreasing the timeout period if, during an attempt to establish a connection, other server addresses in the list remain unused.

10. A computer program product in a computer-readable medium for use in a Web client connectable in a computer network having a plurality of servers and a name service, comprising:
   means responsive to selection of a hypertext reference for issuing a request to the name service and receiving in return a list of server addresses;
   means responsive to the issuing means for favoring a given server address over other server addresses in the list based on a given policy; and
   means for restricting use of a given server address on the list for a given time period.

11. The computer program product as described in claim 10 wherein the restricting means is responsive to a failure to establish a connection from the client machine to a server identified by the given server address during a given timeout period.

12. The computer program product as described in claim 11 wherein the restricting means further includes means for varying the given timeout period.

13. The computer program product as described in claim 10 wherein the given policy configures the list as a random list and the given server address is an address selected at random.

14. The computer program product as described in claim 10 wherein the given policy configures the list as an ordered list and the given server address is a first address on the list.

15. The computer program product as described in claim 10 further including:
   means for determining whether a given time period has elapsed since the list was last retrieved from the name service; and
   means responsive to the determining means for selectively re-fetching the list from the name service.

16. The computer program product as described in claim 10 wherein the computer program product is a browser.

17. The computer program product as described in claim 10 wherein the computer program product is a browser plug-in.

18. A computer for use as a client in a computer network having a plurality of Web servers and a name service, comprising:
   a processor having an operating system;
   a Web browser including means responsive to selection of a hypertext reference for issuing a request to the name service and receiving in return a list of server addresses; and
   means associated with the Web browser for enhancing access to the plurality of Web servers, operative in the client and, comprising:
      means responsive to the issuing means for favoring a given server address over other server addresses in the list based on a given policy; and
      means for restricting use of a given server address on the list for a given time period.

19. The computer as described in claim 18 wherein the restricting means is responsive to a failure to establish a connection from the client machine to a server identified by the given server address during a given timeout period.

20. The computer as described in claim 19 wherein the restricting means further includes means for varying the given timeout period.

21. The computer as described in claim 18 wherein the given policy configures the list as a random list and the given server address is an address selected at random.

22. The computer as described in claim 18 wherein the given policy configures the list as an ordered list and the given server address is a first address on the list.

23. The computer program product as described in claim 18 further including:
   means for determining whether a given time period has elapsed since the list was last retrieved from the name service; and
   means responsive to the determining means for selectively re-fetching the list from the name service.

24. A method of enhancing Web browser access to a plurality of servers in a computer network, where in response to a request issued from the Web browser, a list of server addresses is returned from a name service, the method operative in the client and, comprising the steps of:
   biasing a given server address over other server addresses in the list based on a given policy;
   attempting to establish a connection from the client machine to a server identified by the given server address; and
   if the connection cannot be established using the given server address, using other server addresses in the list to respond to the request.

25. The method as described in claim 24 wherein the given policy configures the list as a random list and the given server address is an IP address selected at random.

26. The method as described in claim 24 wherein the given policy configures the list as an ordered list and the given server address is a primary IP address.

27. The method as described in claim 24 further including the step of re-fetching the list from the name service prior to the biasing step if the list is older than a given age.

28. A method of enhancing Web browser access to a plurality of servers in a computer network, where in response to a request issued from the Web browser, a set of server addresses is returned from a name service, the method operative in the client and, comprising the steps of:
   biasing a subset of the server addresses over other server addresses in the set, wherein each of the server addresses in the subset is a duplicate;
   attempting to establish a connection from the client machine to a server identified by the server addresses in the subset; and
   if the connection cannot be established, using other server addresses in the set to respond to the request.

29. A method of enhancing Web browser access to a plurality of servers in a computer network, where in response to a request issued from the Web browser, a list of server addresses is returned from a name service, the method operative in the client and, comprising the steps of:
   biasing a given server address over other server addresses in the list based on a given policy;
   attempting to establish a connection from the client machine to a server identified by the given server address; and
   if the connection cannot be establish using the given server address, associating the given server address with a given status and using other server addresses in the list to respond to the request.

30. The method as described in claim 29 wherein the given status indicates that the given server address is a bad address.

31. The method as described in claim 29 further including the step of maintaining the given status for a predetermined time period during which the given server address is not used.

32. The method as described in claim 31 further including the step of altering the given status after the predetermined time period.

33. A method of communication in a computer network comprising at least one client, a plurality of servers, and a nameserver, where in response to a request issued from the browser, a list of server addresses is returned from the nameserver, the method operative in the client and, comprising the steps of:

favoring a given server address over other server addresses in the list based on a given policy;

attempting to establish a connection from the client machine to a server identified by the given server address during a timeout period selected as a function of a number of untried server addresses in the list.

34. The method as described in claim 33 further including the steps of:

during the timeout period, determining if the connection to the server identified by the given server address can be established; and if not, attempting to establish a connection from the client machine to a second server identified by at least one of the other server addresses in the list.

\* \* \* \* \*